US012271058B2

(12) United States Patent
Quere et al.

(10) Patent No.: US 12,271,058 B2
(45) Date of Patent: Apr. 8, 2025

(54) METHOD FOR MANUFACTURING AT LEAST ONE OPHTHALMIC LENS

(71) Applicant: ESSILOR INTERNATIONAL, Charenton-le-Pont (FR)

(72) Inventors: Loïc Quere, Charenton-le-Pont (FR); Alexandre Gouraud, Charenton-le-Pont (FR); Pascal Allione, Charenton-le-Pont (FR); Cédric Begon, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 0 days.

(21) Appl. No.: 18/214,128

(22) Filed: Jun. 26, 2023

(65) Prior Publication Data
US 2023/0333409 A1    Oct. 19, 2023

Related U.S. Application Data

(63) Continuation of application No. 14/903,554, filed as application No. PCT/FR2014/051754 on Jul. 8, 2014, now Pat. No. 11,822,152.

(30) Foreign Application Priority Data

Jul. 8, 2013    (FR) ....................................... 1356715

(51) Int. Cl.
*G02C 7/02*    (2006.01)
*B24B 9/14*    (2006.01)
(Continued)

(52) U.S. Cl.
CPC ................ *G02C 7/027* (2013.01); *B24B 9/14* (2013.01); *B29C 64/124* (2017.08);
(Continued)

(58) Field of Classification Search
CPC .. G02C 7/027; G02C 13/001; G02C 2202/12; G02C 2202/16; B29C 64/124;
(Continued)

(56) References Cited

U.S. PATENT DOCUMENTS 6,074,579 A    6/2000   Greshes
7,014,317 B2   3/2006   Gupta et al.
(Continued)

FOREIGN PATENT DOCUMENTS

DE    102009004377         7/2010
DE    102009004377 A1 *   7/2010   ....... B29D 11/00432
(Continued)

OTHER PUBLICATIONS

Machine translation, DE-102009004377 (Year: 2010).*
International Search Report and Written Opinion issued in PCT/FR2014/051754, dated Nov. 6, 2014.

*Primary Examiner* — Michael G Miller
(74) *Attorney, Agent, or Firm* — Norton Rose Fulbright US LLP

(57) ABSTRACT

The invention relates to a method for manufacturing an ophthalmic lens having at least one optical function, comprising the step of providing a starting optical system of the lens, having a basic optical function and the step of additively manufacturing an additional optical element of the lens, by deposition of multiple predetermined bulking components made of at least one material having a predetermined refractive index, directly onto the front surface and/or the rear surface of the starting optical system; wherein the additive manufacturing step comprises the step of determining a manufacturing guideline for the additional optical element on the basis of the characteristics of said at least one optical function to be provided to the lens, the characteristics of said at least one basic optical function, the geometric (Continued)

characteristics of the starting optical system, and the predetermined refractive index of the material.

16 Claims, 3 Drawing Sheets

(51) Int. Cl.
 *B29C 64/124* (2017.01)
 *B29D 11/00* (2006.01)
 *G02C 13/00* (2006.01)
(52) U.S. Cl.
 CPC .. *B29D 11/00009* (2013.01); *B29D 11/00403* (2013.01); *B29D 11/00432* (2013.01); *G02C 13/001* (2013.01); *B29D 11/0073* (2013.01); *B29D 11/00961* (2013.01); *B29K 2995/0026* (2013.01); *B29K 2995/0031* (2013.01); *G02C 2202/12* (2013.01); *G02C 2202/16* (2013.01)
(58) Field of Classification Search
 CPC ........ B29D 11/00009; B29D 11/00961; B29D 11/00432; B29D 11/00403; B24B 9/14; B29K 2995/0026; B29K 2995/0031
 See application file for complete search history.

(56) References Cited

U.S. PATENT DOCUMENTS

| 7,036,929 | B1 | 5/2006 | Harvey | |
|---|---|---|---|---|
| 2003/0081172 | A1 | 5/2003 | Dreher | |
| 2005/0046957 | A1* | 3/2005 | Lai | G02B 1/04 |
| | | | | 359/652 |
| 2007/0146687 | A1* | 6/2007 | Divo | G01M 11/0228 |
| | | | | 356/124 |
| 2011/0013136 | A1 | 1/2011 | Archambeau et al. | |

FOREIGN PATENT DOCUMENTS

| EP | 1896878 | 3/2008 |
|---|---|---|
| EP | 1918760 | 5/2008 |
| EP | 1950601 | 7/2008 |
| EP | 2474404 | 7/2012 |
| JP | 2002182011 | 6/2002 |
| WO | WO 2006/029268 | 3/2006 |

* cited by examiner

METHOD FOR MANUFACTURING AT LEAST ONE OPHTHALMIC LENS

CROSS-REFERENCE TO RELATED APPLICATIONS

This application is a continuation of U.S. application Ser. No. 14/903,554 filed Jan. 7, 2016, which is a national phase application under 35 U.S.C. § 371 of International Application No. PCT/FR2014/051754 filed Jul. 8, 2014, which claims priority to French Application No. 1356715 filed Jul. 8, 2013. The entire contents of each of the above-referenced disclosures is specifically incorporated by reference herein without disclaimer.

FIELD OF THE INVENTION

The invention relates to the field of the manufacture of ophthalmic lenses having at least one optical function, for example progressive ophthalmic lenses.

The invention more particularly relates to a process for manufacturing such ophthalmic lenses.

The invention also relates to a machine for manufacturing such ophthalmic lenses.

TECHNOLOGICAL BACKGROUND

It is known that ophthalmic lenses are subjected to various manufacturing steps in order to give them the prescribed ophthalmic properties (also referred to as "optical function").

Processes for manufacturing ophthalmic lenses are known that comprise a step of providing an unprocessed or semi-finished lens blank, i.e. a lens blank none of the faces or only one of the faces of which is what is referred to as finished (or in other words a face that defines a simple or complex optical surface).

These processes then comprise one or more steps of machining at least one face of the so-called "unprocessed" lens blank, in order to obtain what is referred to as a finished face, defining the sought-after optical surface providing the (possibly complex) optical properties prescribed to the wearer of the ophthalmic lens.

The expression "one or more steps of machining" is here understood to mean steps of what is referred to as roughing, finishing and polishing (machining by surfacing).

The optical function of an ophthalmic lens is delivered mainly by two diopters, corresponding to the front and back faces of the ophthalmic lens. The topography of the surface to be produced depends on the repartition of the applied function between the front and back faces of the lens.

The roughing step makes it possible, starting from an unprocessed or semi-finished lens blank, to impart the thickness and surficial radii of curvature to the face(s) of the lens blank referred to as unfinished, whereas the finishing (also called smoothing) step consists in fining the grain or even the precision of the radii of curvature of the faces obtained beforehand and allows the curved surface(s) generated to be prepared (smoothed) for the polishing step. This polishing step is a step of surfacing the roughed or smoothed curved surface(s), and makes it possible to make the ophthalmic lens transparent. The roughing and finishing steps are the steps that set the thickness of the final lens and the radii of curvature of the treated surface, independently of the thickness of the initial object and of its initial radii of curvature.

It will be noted that one technology for manufacturing complex optical surfaces, called "free-form surfacing" or "digital surfacing", involves particularly precise machining, such a surface for example combining a torus and a progression. The machining of such a complex optical surface is carried out using at least one very high-precision machine tool at least for the roughing step, or even for the finishing and polishing step, and/or a polisher capable of polishing the surface(s) obtained in the preceding steps, without deforming the ophthalmic lens.

SUBJECT OF THE INVENTION

The invention aims to provide a process for manufacturing an ophthalmic lens having at least one optical function, which is particularly simple, easy and economical to implement, and that is also capable of delivering rapidly and flexibly lenses having very diverse geometries and ophthalmic and material properties, meeting a mass-market personalization requirement.

Thus, the subject of the invention, according to a first aspect, is a process for manufacturing at least one ophthalmic lens having at least one optical function, characterized in that it comprises:

the step of providing a starting optical system of said at least one ophthalmic lens, having a base optical function delivered by a front face and a back face of said starting optical system; and the step of additively manufacturing an optical element that is complementary to said at least one ophthalmic lens, by depositing a plurality of predetermined volume elements of at least one material having a predetermined refractive index, directly on at least one of said front face and back face of said starting optical system, said additive manufacturing step comprising the step of defining manufacturing settings of said complementary optical element from characteristics of said at least one optical function to be provided to said at least one ophthalmic lens, from characteristics of said at least one base optical function of said starting optical system, from geometric characteristics of said starting optical system and from said predetermined refractive index of said at least one material.

The process according to the invention thus makes it possible to obtain an ophthalmic lens formed from a starting optical system, also referred to as the base lens, and a complementary optical element, also referred to as the extra optical thickness, additively manufactured directly on the starting optical system. The term "directly" means that there is no intermediate part (for example a manufacturing holder of an additive manufacturing machine) between the starting optical system and the complementary optical element, neither during its manufacture nor once the ophthalmic lens has been manufactured. It will be noted that a predetermined treatment may be carried out on the face(s) of the starting optical system on which an extra thickness may be manufactured, this treatment being configured to facilitate the adhesion of the material forming the complementary optical element, without however it being an intermediate part. This treatment may be one or more chemical or physical surface activation treatments, such as for example corona or plasma treatments, treatments in alcohol- or sodium-containing solutions or radiation treatments. Likewise, the starting optical system may comprise a bond layer and/or may comprise at least one layer allowing the optical impedance of the starting optical system to be matched to that of the complementary optical element when said system and element have different refractive indices.

It will be noted that the expression "ophthalmic lens" is here understood to mean an optical lens of ophthalmic quality intended to be fitted in a frame of a pair of spectacles. It may therefore be a question of an ophthalmic lens having the shape of the frame or of a lens still requiring edging, or even of a lens already securely fitted in the frame. It may therefore be a question of a progressive, multifocal, bifocal or single-vision lens or even a single ophthalmic eyeglass intended to face the right eye and left eye, such ophthalmic eyeglasses especially being known as shields or visors.

The (front or back) face of the starting optical system on which the complementary optical element is directly manufactured is at least partially curved and therefore has a curvature or radii of curvature on its surface.

It will be noted that the starting optical system may comprise a frame able to receive two separate ophthalmic lenses, intended to face the right eye and left eye, respectively, or a frame able to receive a single ophthalmic eyeglass intended to face the right and left eyes (shield or visor). It will be noted that in the context of the invention, the components of the optical system comprising at least one frame and at least one ophthalmic eyeglass may be manufactured separately or integrally.

It will be noted that the complementary optical element may for example comprise an extra thickness produced on one of the front and back faces of the starting optical system, or indeed an extra thickness produced on the front face and an extra thickness produced on the back face of the starting optical system.

It will be noted that since the ophthalmic lens is the result of the combination of the starting optical system and the complementary optical element, the inherent properties of this system and this element are found in the ophthalmic lens. Thus, it is for example particularly advantageous to choose a starting optical system having predetermined properties in order to give them to the lens. It may for example be a question of a starting optical system having a predetermined rigidity and/or formed from a material having a high heat resistance.

By virtue of the process according to invention, it is not necessary to manufacture the entirety of the ophthalmic lens by additive manufacturing. This process thus allows, by virtue of the use of the starting optical system, which is preferably manufactured using conventional techniques (for example molding and optionally machining), the amount of additive manufacturing material used to obtain the ophthalmic lens to be optimized. Furthermore, the materials from which the starting optical system and complementary optical element are formed may be chosen to have different respective refractive indices so as to optimize (decrease) the thickness of the complementary optical element and thus further optimize the amount of additive manufacturing material used to obtain the ophthalmic lens. Furthermore, it is thus possible to update the prescription of the wearer while allowing him to retain other function(s) of his starting optical system, for example particular treatments such as photochromic treatments or a polarization filter or, in the case of active eyeglasses, to allow him to retain his settings and/or the active system.

The manufacturing process according to the invention therefore makes it possible to obtain an ophthalmic lens having an optical function resulting from the combination of a (zero or non-zero) base optical function of the starting optical system and of a (non-zero, simple or complex and potentially additional) complementary optical function of the complementary optical element.

It is possible to define a simple optical function as being the optical function obtained with spherical or toroidal surfaces.

A contrario, it is possible to define a complex optical function as being the optical function obtained with at least one surface that is not simple, i.e. for example an aspherical or atoric surface having a function associated with framing, or even a freecurve.

In addition, it is possible to define an additional optical function as being an optical function that exhibits a possibly continuous power variation as a function of position on the eyeglass and/or as a function of time. This may for example be a progressive optical function or a multifocal optical function such as a bifocal or trifocal function, or an optical function the power of which is controlled over time, such as may for example be the case for a fluid lens or a lens having an active function or an informative lens.

It will be noted that it is the complementary optical element that allows the optical function desired for the ophthalmic lens to be obtained from the starting optical system, even if the starting optical system already has an optical function. In other words, without this complementary optical element, the ophthalmic lens would not have the optical function prescribed thereto. This complementary optical element is therefore nothing to do with simple surface coatings, such as antireflection coatings, anti-fog coatings, anti-scratch coatings or even anti-smudge coatings.

It will be noted that, in the context of the present invention, which relates to the field of ophthalmics, the optical function to be given to the ophthalmic lens makes it possible to correct aberrations, i.e. defects in an optical system, namely the eye of the wearer of the ophthalmic lens, which are here only of what is referred to as lower order. In other words, the optical function to be given to the ophthalmic lens must at least make it possible to correct lower-order aberrations and not be limited to enabling the correction of what are referred to as higher-order aberrations.

In practice, in the field of ophthalmics, the ophthalmic properties prescribed to the wearer of the ophthalmic lens, which define the optical function to be given to this lens, are generally expressed in diopters (D) and are quantified in increments of 0.25 D.

It will be noted that during the manufacture of such ophthalmic lenses, manufacturing tolerances of about 0.06 D to 0.12 D are generally acceptable. Thus, in the field of ophthalmics, the power to be provided is at least higher than 0.06 D and preferably higher than 0.12 D and for example comprised in the interval [0.12 D; 12 D], and preferably in the interval [0.25 D; 5 D].

Moreover, it will be noted that the optical power, or the wearer power, thus obtained once the optical function has been given to the ophthalmic lens, is calculated from measurements generally taken according to standard ISO_10322-2(F) by means of a lensmeter, and therefore with a lensmeter analysis pupil of at least about 3 to 5 mm.

Additive manufacturing techniques are a particularly appropriate way of meeting the objective of the invention.

The expression "additive manufacturing" is understood to mean, according to international standard ASTM 2792-12, manufacturing techniques implementing a process involving fusing materials in order to manufacture objects from 3D modeling data (typically a computer-assisted design (CAD below) file), usually representing a layer-by-layer design, as opposed to subtractive manufacturing methodologies, such as traditional machining.

The additive manufacturing here corresponds, for example, to a three-dimensional printing process involving, for example, inkjet printing of a polymer, or a stereolithography process, or even a mask projection stereolithography process, or a selective laser melting (SLM) or selective laser sintering (SLS) process, or indeed a thermoplastic filament extrusion process.

Additive manufacturing technologies consist in manufacturing objects by juxtaposing material elements in accordance with a predetermined arrangement contained in digital form in a CAD file. The constituent material of the additively manufactured volume elements may be a solid, liquid or take the form of a gel, although it is conventional for the material to be essentially solid at the end of the additive manufacturing process.

These elementary volume elements, denoted "voxels", may be created and juxtaposed using a variety of different technical principles, for example by providing drops of photopolymerizable monomers by means of a print head, by selectively photopolymerizing with a source of UV light near the surface of a bath of monomer (stereolithography technique), or by melting polymer powder (SLM).

It will be seen that the starting optical system forms as such a manufacturing holder for the complementary optical element. Here, the manufacturing holder therefore does not belong to the additive manufacturing machine, which comprises a receiving holder intended to receive the starting optical system. Thus, the manufacturing holder (starting optical system) is distinct from the receiving holder, which is not intended to form part of the ophthalmic lens.

The manufacturing process according to the invention is therefore particularly simple, easy and economic, above all in the context of production of a wide diversity of optical functions (because of the personalization of these optical functions), requiring manufacturing processes that are rapid and flexible.

It will also be noted that the expression "optical function" when applied to a lens, a system or an optical element, is understood to mean the optical response of this lens, this system or this element, i.e. a function defining any modification of the propagation and transmission of an optical beam through the lens, system or optical element in question, for any incidence of the entering optical beam and over the entire geometric extent of the entrance diopter illuminated by the incident optical beam.

More precisely, in the ophthalmic field, optical function is defined as the distribution of the wearer-power and astigmatism characteristics and of the prismatic deviations associated with the lens, system or optical element for all the directions of the gaze of a wearer of this lens, this system or this element. Of course, this assumes that the geometric position of the lens, system or optical element relative to the eye of the wearer is already known.

According to preferred, simple, practical and economical features of the process according to the invention:

said additive manufacturing step comprises the step of determining geometric characteristics of said complementary optical element and/or of said at least one ophthalmic lens from characteristics of at least one complementary optical function to be provided to said complementary optical element, from said geometric characteristics of said starting optical system and from said predetermined refractive index of said at least one material;

said additive manufacturing step comprises the step of determining at least one complementary optical function to be provided to said complementary optical element from said characteristics of said at least one optical function to be provided to said at least one ophthalmic lens and from said characteristics of said at least one base optical function of said starting optical system;

said additive manufacturing step comprises the step of determining said at least one optical function to be given to said at least one ophthalmic lens from prescription values associated with a wearer of said at least one ophthalmic lens and complementary fitting data of a predetermined frame and/or personalization data and/or frame-shape data;

said additive manufacturing step comprises the step of measuring said characteristics of said at least one base optical function of said starting optical system and/or the step of measuring said geometric characteristics of said starting optical system;

said at least one material from which said complementary optical element is additively manufactured is different from the constituent material of said starting optical system;

said starting optical system is formed by an assembly comprising a frame and two initial ophthalmic lenses fitted in said frame, and said process comprises a step of additively manufacturing two said complementary optical elements one on each of said initial ophthalmic lenses used as starting optical system, in order to form two said ophthalmic lenses, said manufacturing settings furthermore being determined from characteristics related to the binocular vision of a wearer of said two ophthalmic lenses;

said additive manufacturing step preferably implements a three-dimensional printing, or stereolithography, or mask projection stereolithography process or even a selective laser melting or sintering process, or a thermoplastic filament extrusion process;

said additive manufacturing step is carried out by depositing a plurality of at least one predetermined volume element of said at least one material on at least all the work area of at least one of said front face and back face of said starting optical system;

the process comprises, before said additive manufacturing step, the step of placing and positioning said starting optical system on a receiving holder in an additive manufacturing machine;

the process comprises, after said step of positioning said starting optical system and before said additive manufacturing step, the step of checking the position of said starting optical system in said additive manufacturing machine and the step of triggering a corrective action if there is a discrepancy between the actual position of said starting optical system and a predetermined position;

after said additive manufacturing step, said complementary optical element and/or said starting optical system have an outline substantially equal to an outline configured to be inserted into a predetermined frame;

the process comprises the step of edging said complementary optical element and/or said starting optical system, to an outline configured to be inserted into a predetermined frame;

the process comprises, after the additive manufacturing step, the step of irradiating said ophthalmic lens; and/or the process comprises the step of treating and/or varnishing at least one face of said ophthalmic lens.

Another subject of the invention, according to a second aspect, is an additive manufacturing machine configured to manufacture an ophthalmic lens and comprising a command/control unit provided with system elements configured to run a computer program comprising instructions configured to implement each of the steps of the manufacturing process described above.

According to preferred, simple, practical and economical features of the machine according to the invention:
the machine comprises a receiving holder configured to receive said starting optical system, said receiving holder and/or said starting optical system being configured so that the latter is positioned in a predetermined position relative to a coordinate system of said machine; and/or
the machine comprises a detecting system, for example formed by an optical reading device and/or an image-capturing device, configured to detect the position of said starting optical system on said receiving holder and/or relative to said predetermined position in said coordinate system of said machine.

BRIEF DESCRIPTION OF THE DRAWINGS

The subject matter of the invention will now be explained by way of a description of one embodiment thereof, given, by way of nonlimiting illustration, below with reference to the appended drawings, in which.

DETAILED DESCRIPTION OF AN EXAMPLE EMBODIMENT

Figure 1:
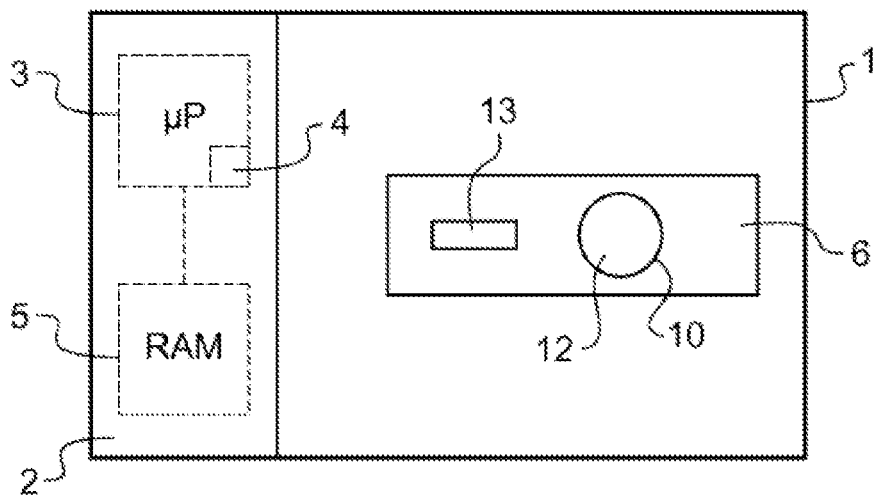
FIG. 1 schematically shows an additive manufacturing machine configured to produce at least one complementary optical element directly on a starting optical system in order to obtain at least one ophthalmic lens.

FIG. 1 illustrates a machine 1 for additively manufacturing an ophthalmic lens 12, here a digitally controlled three-dimensional printing machine.

Digitally controlled designates that the additive manufacturing machine 1 includes a suite of hardware configured to give motional instructions to all the units that this machine comprises.

The additive manufacturing machine 1 is here configured to deposit, in juxtaposition, a plurality of predetermined volume elements forming superposed layers (layer-by-layer deposition in other words), of at least one material, directly on a starting optical system 20 and 41 (FIGS. 2 to 5) positioned on a receiving holder 10 of the machine 1 in order to form a complementary optical element 25, 30, 35 and 47 (FIGS. 2 to 5) and thus obtain the ophthalmic lens 12.

This ophthalmic lens 12 is for example progressive and furthermore possesses toroidal and prismatic components.

Each predetermined volume element is defined by a predetermined composition, a predetermined position in space and predetermined dimensions at an instant t.

As it is here a question of additive manufacturing and for example of three-dimensional printing, volumetric elements or volume elements, also referred to as voxels (three-dimensional pixels), are also spoken of.

The complementary optical element 25, 30, 35 and 47 and the starting optical system 20, 41 are configured to form the ophthalmic lens 12. It is therefore a question of an element and of a system possessing at least one optical function, which is also what is referred to as "ophthalmic" in certain cases and for example progressive, and possibly furthermore possessing toroidal and prismatic components. In contrast to the complementary optical element 25, 30, 35 and 47 that has, according to the invention, a non-zero complementary optical function, the starting optical system 20, 41 may have a zero or non-zero optical function.

Thus, the starting optical system may provide a simple or complex optical function, or even comprise active optical elements such as a waveguide, an image guide and/or pixelated optical elements comprising cells that adjoin or are separated by walls and that contain a photoactive or electroactive composition.

The starting optical system 20, 41 is held by the receiving holder 10 whereas the complementary optical element 25, 30, 35 and 47 is manufactured directly on the starting optical system 20, 41, this system and this element being configured to be securely fastened together and thus form an ophthalmic lens 12 of integral construction, whereas the latter is configured to be separated from the receiving holder 10.

It will be noted that the receiving holder 10 is a predetermined holder of the additive manufacturing machine 1 and therefore its geometric characteristics are known and contained in a file that is stored in or loaded into a first command/control unit 2 of the additive manufacturing machine 1.

The receiving holder 10 of the additive manufacturing machine 1 comprises a body provided with a receiving surface that has an overall geometry, all or some of which is independent or dependent on the geometry of at least one surface of the starting optical system and therefore of the ophthalmic lens 12 to be produced.

The receiving holder 10 may be removable or fixed in the machine 1, or it may even be able to be fitted in another machine used to complement the additive manufacturing machine, for example a edging machine and/or a treatment and/or varnishing machine.

It will be noted that the receiving holder 10 and/or the starting optical system 20, 41 are configured so that the latter is positioned in a predetermined position on the receiving holder 10, and relative to a coordinate system of the machine 1.

Here, the receiving holder 10 is for example provided with a plurality of positioning tabs (not shown), in particular at least three.

Furthermore, the machine 1 here comprises a detecting system for example formed by an optical reading device (not shown) configured to detect, for example, an optical axis of the starting optical system.

As a variant, the machine 1 comprises a detecting system for example formed by an optical reading device and/or an image-capturing device (neither of which is illustrated), these devices being configured to detect the position of said starting optical system on said receiving holder 10 and/or relative to said predetermined position in the coordinate system of said machine 1.

The hardware and software of the additive manufacturing machine 1 is furthermore configured to generate motional, handling and control instructions for materials and polymerization devices that this machine 1 comprises.

The additive manufacturing machine 1 comprises a nozzle or a bank of nozzles 13 in addition to the command/control unit 2, and the latter is provided with a data processing system comprising a microprocessor 3 equipped with a memory 4, especially a nonvolatile memory, allowing the microprocessor 3 to load and store a software package, in other words a computer program, that, when it is run by the microprocessor 3, allows an additive manufacturing process to be implemented. This nonvolatile memory 4 is for example a read-only memory (ROM).

The unit 2 furthermore comprises a memory 5, in particular a volatile memory, making it possible to store data during the execution of the software package and the implementation of the additive manufacturing process.

This volatile memory 5 is for example a random access memory (RAM) or an electrically erasable programmable read-only memory (EEPROM).

The additive manufacturing machine 1 in addition comprises an aperture 6, here filled with a window, configured to allow access to the ophthalmic lens 12 partially additively manufactured, by this machine 1, directly on its starting optical system 20, 41, which system is held by the receiving holder 10 of the machine 1.

It will be noted that in order to additively manufacture the complementary optical element 25, 30, 35, 47 and 50, it is necessary to know with precision certain additive manufacturing parameters, such as the speed of advance of the nozzle or nozzles 13 and the type of energy and energy source employed; here a source emitting in the ultraviolet is employed in the three-dimensional printing machine but it could be a laser in the case of a stereolithography machine or else thermal energy could be used, as is the case with tensioned filament deposition, also referred to as thermoplastic filament extrusion.

It is also necessary to know precisely which one or more materials are being used and their states, here these materials take the form of polymerizable compositions, or of thermoplastic polymer filaments, droplets, or powders.

It is also necessary to know with precision the simple or complex optical functions prescribed to the ophthalmic lens 12, which optical functions are characterized by geometries defined in a characteristic manufacturing file of the simple or complex optical properties of the ophthalmic lens 12.

According to one variant, it is also necessary to know personalization parameters of the wearer and/or parameters of the geometry of the frame intended to receive the ophthalmic lens 12, in order to adjust the optical function of this ophthalmic lens 12 to these final use conditions.

Knowing the optical function, and certain personalization and/or frame parameters makes it possible to determine the geometric envelope (also referred to as the three-dimensional external envelope) required for the ophthalmic lens 12. This geometric envelope defines the geometric characteristics of the ophthalmic lens (12). This three-dimensional external envelope encompasses the geometric envelope of the starting optical system 20, 41 and that (or those) of the complementary optical element 25, 30, 35, 47 and 50, which may be formed from one or more extra thicknesses adjoined to at least one face of the starting optical system 20, 41.

It will be recalled that the expression "optical function" when applied to an ophthalmic lens, an optical system or an optical element, is understood to mean the optical response of this lens, or this system or this element, i.e. a function defining any modification of the propagation and transmission of an optical beam through the lens, system or optical element in question, whatever the incidence of the entering optical beam and whatever the geometric extent of the entrance diopter illuminated by the incident optical beam.

More precisely, in the ophthalmic field, optical function is defined as the distribution of the wearer-power and astigmatism characteristics associated with the lens, system or optical element for all the directions of the gaze of a wearer of this lens, this system or this element. Of course, this assumes that the geometric position of the lens, system or optical element relative to the eye of the wearer is already known.

In the context of the present invention, which relates to the field of ophthalmics, the optical function to be given to the ophthalmic lens makes it possible to correct aberrations, i.e. defects in an optical system, namely the eye of the wearer of the ophthalmic lens, which are here only of what is referred to as lower order. In other words, the optical function to be given to the ophthalmic lens is not limited to the correction of what are referred to as higher-order aberrations.

In practice, in the field of ophthalmics, the ophthalmic properties prescribed to the wearer of the ophthalmic lens, which define the optical function to be given to this lens, are generally expressed in diopters (D) and are quantified in increments of 0.25 D.

It will be noted that during the manufacture of such ophthalmic lenses, manufacturing tolerances of about 0.06 D to 0.12 D are generally acceptable.

It will also be noted that wearer power is just one way of calculating and adjusting the power of the ophthalmic lens, another way being to use lensmeter power. Calculation of wearer power ensures that the power perceived by the wearer (i.e. the power of the beam of light that enters into the eye), once the lens has been fitted in the frame and is being worn by the wearer, corresponds to the prescribed power. In general, for a progressive eyeglass, at any point on the eyeglass and especially at its far-vision and near-vision reference points, the power measured with a lensmeter is different from the wearer power. However, the wearer power at the optical center of a unifocal lens is generally close to the power observed with a lensmeter positioned at this point.

Figure 2:
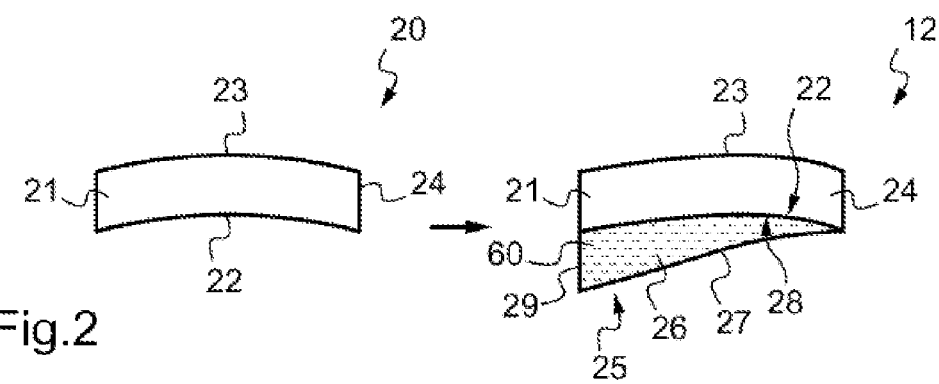
FIG. 2 schematically shows a starting optical system and an ophthalmic lens comprising this starting optical system and obtained at least partially using the machine illustrated in FIG. 1.

FIG. 2 schematically shows an ophthalmic lens 12 obtained from a starting optical system 20 and a complementary optical element 25 manufactured additively on the receiving holder.

It will be noted that the assembly formed by the starting optical system 25 and the complementary optical element 25 forms what is called a hybrid ophthalmic lens 12.

The starting optical system 20 has a body 21 provided with a first face 22, called the back face, that here is concave, and a second face 23, called the front face, that here is convex.

It will be noted that the front and back faces 23 and 22 define two diopters that will characterize the base optical function (denoted $F_0$ in FIG. 7) of the starting optical system 20 of the ophthalmic lens 12.

Here, the starting optical system 20 is what is referred to as a semi-finished spectacle eyeglass, the front face 23 of which has a finished surface, in other words a surface having the desired curvature or radii of curvature, and that has already been given one or more treatments, for example anti-scratch treatments.

This starting optical system 20 is made of a material generally used to manufacture ophthalmic lenses and here has a non-zero simple optical function (it could have a complex optical function), the characteristics of this simple optical function being known and characterized in a file stored in or loaded into the command/control unit 2 of the additive manufacturing machine 1.

The starting optical system 20 has a peripheral edge face 24 connecting the back face 22 to the front face 23.

Here, the starting optical system 20 has been manufactured directly with an outline matching a shape of a predetermined frame in which the ophthalmic lens 12 is configured to be fitted.

As a variant, the starting optical system 20 is not directly manufactured with the frame outline but requires a edging step in order to have its outline matched to the frame.

The complementary optical element 25 has a body 26 provided with a first face 27, called the back face, that here is pseudo-concave, and a second face 28, called the front face, that here is convex.

It will be noted that the front and back faces 28 and 27 also define two diopters that will characterize the complementary optical function (denoted $F_2$ in FIG. 7) of the complementary optical element 25 of the ophthalmic lens 12, which complementary optical function here especially includes an addition.

The complementary optical element 25 has a peripheral edge face 29 connecting the back face 27 to the front face 28.

Here, the complementary optical element 25 has been additively manufactured on the back face 22 of the starting optical system 20 in order to form the ophthalmic lens 12. Thus, the front face 28 of the complementary optical element 25 is perfectly complementary to the back face 22 of the starting optical system 20.

The complementary optical element 25 therefore here forms a single extra thickness adjoined to the back face 22 of the starting optical system 20.

It will be noted that to additively manufacture the complementary optical element 25, the starting optical system 20 is inserted into the machine and positioned on the receiving holder with the front face 23 of the starting optical system 20 resting on a face of the receiving holder.

The complementary optical element 25 is manufactured to the frame outline, its peripheral edge face 29 thus lying in the extension of the peripheral edge face 24 of the starting optical system 20.

As variants, the complementary optical element 25 may have a peripheral edge face forming an outline slightly different to that desired for the ophthalmic lens 12, for example slightly smaller or slightly larger than an outline configured to be inserted into the predetermined frame, or comprising extensions in order to allow the lens to be handled, or for another reason. In the case where the complementary optical element 25 has a peripheral edge face forming an outline larger than the outline desired for the edge face of the ophthalmic lens 12, then it will be understood that this complementary outline forms part of the extra thickness produced in the additive manufacturing step and that this outline is defined in the step of defining the manufacturing settings. In a yet more particular case, the outline of the complementary optical element 25 is exactly that desired for the ophthalmic lens 12.

Below, the term "work area" will be used with regard to the starting optical system and/or complementary optical element. It is a question of the area included within an outline corresponding to the outline of the ophthalmic lens having the shape recommended for insertion into a predetermined frame. The ophthalmic lens may be given the shape recommended for insertion into the predetermined frame: before the process begins, the starting optical system then already having this outline; at the start of the process, for example when a step of edging the starting optical system is carried out before the step of additively manufacturing the complementary optical element; or by edging, following the step of additively manufacturing the complementary optical element. In all these cases it is possible to identify an area of the starting optical system and/or complementary optical element that is intended to be contained within the outline of the ophthalmic lens having the shape recommended for insertion into a predetermined frame. This specific area is defined as being the work area.

It will be noted that the ability to manufacture a complementary optical element on a starting optical system that already has the shape recommended for insertion into a predetermined frame may allow, on the one hand, the risk of eyeglass misalignment, which could occur in a subsequent edging step possibly carried out in an optician's shop, to be decreased, and on the other hand, the currently required stocks of semi-finished lens blanks to be decreased.

The complementary optical element 25 is here formed by a plurality of predetermined volume elements that are juxtaposed and superposed to form a plurality of superposed layers of a material 60. This plurality of superposed layers forms the body 26, together with the back face 27 and the front face 23 of this complementary optical element 25.

These predetermined volume elements may have a different geometry and be different volumes from each other, insofar as the implementation of an additive manufacturing process allows it. These volume elements may also consist of a single material, or as a variant they may be formed by at least two different materials, for example having different refractive indices, thereby making possible to obtain an extra thickness of variable refractive index.

It will be noted that the use of at least two materials having different refractive indices in the additive manufacture of the complementary optical element 25 allows optimized optical and functional properties to be given to the ophthalmic lens 12.

It will be noted that the superposed layers of the first material 60 here have different lengths so as to form the back and front faces 27 and 28 of the complementary optical element 25.

It will be noted that the notion of "layers" is only nominally applicable to certain additive manufacturing technologies, a layer then merely being a set of voxels artificially deposited in one given pass of the nozzles or with one given mask. However, the teaching of the present invention is easily transferred to these technologies.

These layers here each have a substantially constant thickness over their length and they all have substantially the same thickness. It will be noted that certain additive manufacturing technologies may produce layers with thicknesses that vary along their length. However, the teaching of the present invention is easily transferred to these technologies.

It will be noted that this equi-thickness is obtained here by virtue of controlled deposition, by the nozzle or the bank of nozzles 13 of the additive manufacturing machine 1, of a set number of predetermined volume elements in each superposed layer of the material 60.

Here, the material 60 is an acrylic polymer, and more precisely a photopolymer, for example a photopolymer such as the product marketed by the company OBJET Ltd, under the trademark VeroClear™.

The additive manufacture of the complementary optical element 25 may require, in addition to the deposition of the plurality of successive superposed layers, one or more photopolymerization steps. The photopolymerization steps may take place on deposition of each volume element or a blanket photopolymerization may be carried out after one pass of the nozzle and/or the bank of nozzles or after each layer of material has been deposited. Moreover, it will be noted, as will be seen below in more detail, that the complementary optical element 25 may not be completely polymerized at the end of its additive manufacture.

The ophthalmic lens 12 thus obtained has a body formed from the respective bodies 21 and 26 of the starting optical system 20 and of the complementary optical element 25, a front face formed by the front face 23 of the starting optical system 20, a back face formed by the back face 27 of the complementary optical element 25 and a peripheral edge face formed by the respective peripheral edge faces 21 and 29 of the starting optical system 20 and of the complementary optical element 25; and possesses the optical function (denoted $F_1$ in FIG. 7) prescribed thereto.

Figure 3:
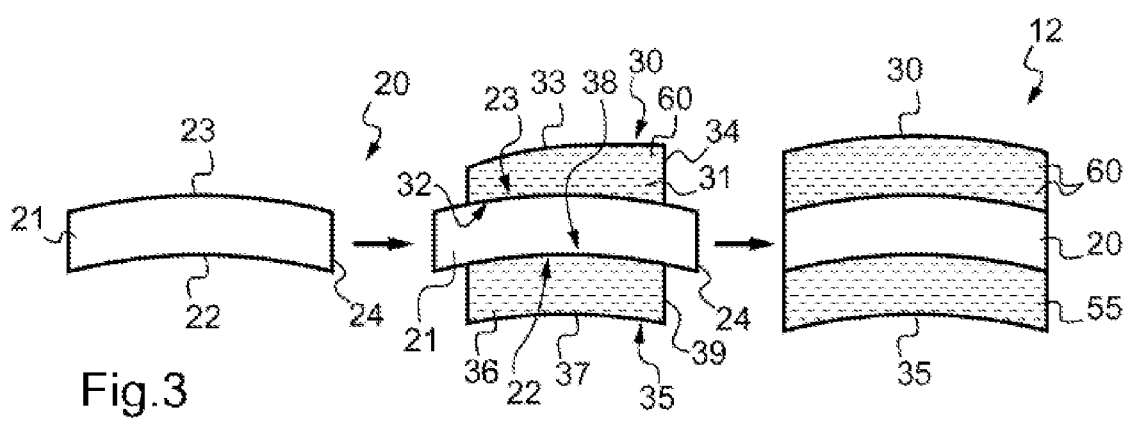
FIGS. 3 to 5 are similar views to that in FIG. 2, illustrating various variant embodiments of ophthalmic lenses.

FIG. 3 schematically shows a first variant of the ophthalmic lens 12 obtained from a starting optical system 20 and a complementary optical element provided with two separate extra thicknesses 30 and 35.

The starting optical system 20 has a similar geometry to that described with reference to FIG. 2, except that it comprises a peripheral edge face 24 that does not match the outline of a predetermined frame. Furthermore, it is here a question of an unprocessed lens blank, i.e. one without what is referred to as a finished face, treated with value-adding treatments such as antireflection or anti-scratch treatments, inter-alia.

The complementary optical element comprises a first extra thickness 30 adjoining the front face 23 of the starting optical system 20 and a second extra thickness 35 adjoining the back face 22 of the starting optical system 20.

The first extra thickness 30 has a body 31 provided with a first face 32, called the back face, that here is concave, and a second face 33, called the front face, that here is convex.

It will be noted that the front and back faces 33 and 32 also define two diopters that will characterize a first sub-function of the complementary optical function of the complementary optical element.

The first extra thickness 30 comprises a peripheral edge face 34 connecting the back face 32 to the front face 33 and manufactured directly to the outline of a predetermined frame.

Here, the first extra thickness 30 has been additively manufactured on the front face 23 of the starting optical system 20. The back face 32 of the first extra thickness 30 is perfectly complementary to the work area of the front face 23 of the starting optical system 20 (the work area being the portion of this face 23 that will remain once the system 20 has been edged and the lens 12 obtained).

It will be noted that to additively manufacture the first extra thickness 30, the starting optical system 20 is inserted into the machine and positioned on the receiving holder with the back face 22 of the starting optical system 20 resting on a face of the receiving holder.

The first extra thickness 30 is here formed by a plurality of predetermined volume elements that are juxtaposed and superposed to form a plurality of superposed layers of a material 60.

This plurality of superposed layers forms the body 31, together with the back face 32 and the front face 33 of this first extra thickness 30.

The second extra thickness 35 has a body 36 provided with a first face 37, called the back face, that here is concave, and a second face 38, called the front face, that here is convex.

It will be noted that the front and back faces 38 and 37 also define two diopters that will characterize a second sub-function of the complementary optical function of the complementary optical element.

The second extra thickness 35 comprises a peripheral edge face 39 connecting the back face 37 to the front face 38 and manufactured directly to the outline of the predetermined frame.

Here, the second extra thickness 35 has been additively manufactured on the back face 22 of the starting optical system 20. The front face 38 of the second extra thickness 35 is perfectly complementary to only one portion of the back face 22 of the starting optical system 20 (the portion of this face 22 that will remain once the system 20 has been edged and the lens 12 obtained).

The second extra thickness 35 is here formed by a plurality of predetermined volume elements that are juxtaposed and superposed to form a plurality of superposed layers of another material 55 different from the material 60 used to manufacture the first extra thickness 30.

This plurality of superposed layers forms the body 36, together with the back face 37 and the front face 38 of this second extra thickness 35.

It will be noted that to additively manufacture the second extra thickness 35, the starting optical system 20 and the first extra thickness 30 are removed from the receiving holder 10 then placed back on the latter, in the machine, and positioned on the receiving holder with the front face 33 of the first extra thickness 30 and/or with the portion of the front face 23 of the starting optical system 20 that is not covered with the first extra thickness 30, resting on a face of the receiving holder.

As a variant, the starting optical system is inserted into the machine 1 and positioned on a different receiving holder from that described above, for example having holding tabs configured to hold the starting optical system via its peripheral edge face. Furthermore, these holding tabs may be hinged so as to make it possible to additively manufacture first one of the two extra thicknesses, and then the other after having flipped the starting optical system/extra thickness assembly.

The starting optical system 20 is then edged so as to give it a new peripheral edge face, in the extension of the peripheral edge faces 34 and 39 of the first and second extra thicknesses 30 and 35, respectively, and which matches the outline of the predetermined frame.

Alternatively, at least one extra thickness 30, 35 may have an area that does not correspond to the work area.

In particular, when the starting optical system 20 is edged following the additive manufacturing step, in order to give the system a new peripheral edge face matching the outline of the predetermined frame, at least one of the peripheral edge faces 34 and 39 of the first and second extra thicknesses 30 and 35, respectively, does not correspond to the new peripheral edge face. In other words, when the starting optical system has a larger area than the work area when the complementary optical element is manufactured, at least one extra thickness may have an area that does not correspond to the work area.

In particular, according to one embodiment, at least one of the extra thicknesses may completely cover that surface 23 or 22 of the starting optical system 20 on which it is deposited. Alternatively, at least one portion of the work area of one of the surfaces 22 and 23 of the starting optical system 20 is not covered by the corresponding extra thickness 30, 35.

Alternatively or in addition, at least one portion of the surfaces 23 and 22 of the starting optical system 20, beyond the work area, is covered by the corresponding extra thickness 30, 35, respectively.

Preferably, the one or more extra thicknesses 30 and 35 cover at least all that zone of the corresponding face which is intended to be inside the peripheral edge face of the ophthalmic lens having an outline matched to the outline of the predetermined frame. In other words, the extra thickness 30, 35 covers at least the entire work area of the surface 22, 23 of that face of the starting optical system 20 on which it is deposited in the additive manufacturing step, respectively.

It will be noted that if the complementary optical element must have an outline smaller than the outline of the ophthalmic lens for the latter to be fittable into the frame, then it will be understood that the extra thickness then covers all the work area.

More preferably, at least one of the extra thicknesses 30 and 35 covers only that zone of their corresponding face which is intended to be inside the new peripheral zone. In other words, the extra thickness 30, 35 covers only the work area of the surface 22, 23 of that face of the starting optical system 20 on which it is deposited in the additive manufacturing step, respectively.

The ophthalmic lens 12 thus obtained has a body formed from the respective bodies 21, 31 and 36 of the starting optical system 20 and of the two extra thicknesses 30 and 35 of the complementary optical element, a front face formed by the front face 33 of the first extra thickness 30 of the complementary optical element, a back face formed by the back face 37 of the second extra thickness of the complementary optical element and a peripheral edge face formed by the peripheral edge faces of the edged starting optical system 20 and of the extra thicknesses 30 and 35 of the complementary optical element; and possesses the optical function prescribed thereto.

Figure 4:
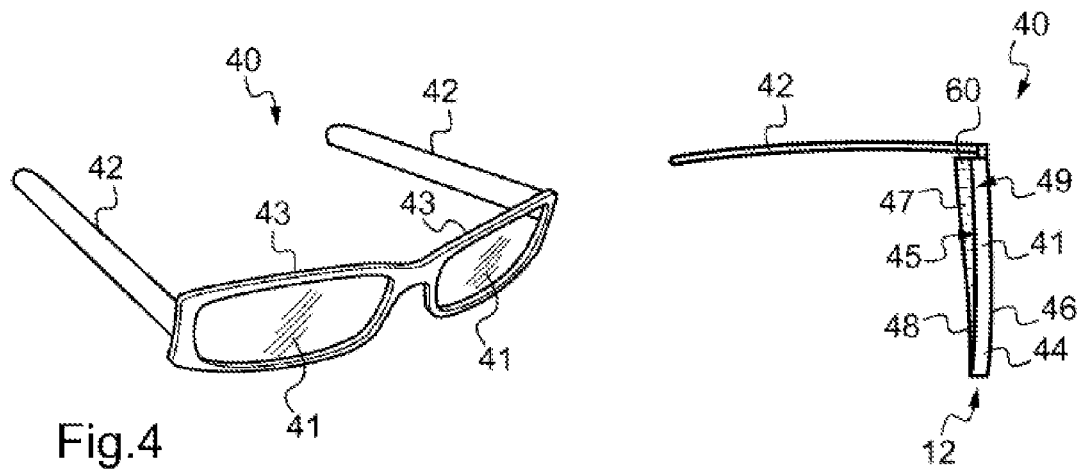

FIG. 4 shows, schematically, two ophthalmic lenses 12 according to a second variant embodiment, said lenses being obtained from a starting optical system 40 and two additively manufactured complementary optical elements 47.

Here, the starting optical system 40 is formed by an assembly comprising a spectacle frame having two temples 42 and a front 43 to which the two temples 42 are connected, and two base lenses 41 fitted in the front 43 of the frame.

Each base lens 41 has a body 44 provided with a first face 45, called the back face, that here is concave, and a second face 46, called the front face, that here is convex.

Each base lens 41 here is what is referred to as a demonstration eyeglass, which are generally found, at an opticians, already fitted in a demonstration frame.

Thus, it will be noted that the front and back faces 46 and 45 define two curved surfaces that characterize a base optical function, that here is zero, of each base lens 41.

Each base lens 41 has a peripheral edge face connecting the back face 45 to the front face 46.

Each base lens 41 has an outline matched to a predetermined frame shape into which the ophthalmic lenses 12 are configured to be fitted, since they are each initially, i.e. before the process according to the invention starts, already fitted in the predetermined frame.

Each complementary optical element 47 is here similar to the complementary optical element 25 described above with reference to FIG. 2.

In particular, each complementary optical element 47 has a body provided with a first face 48, called the back face, that here is concave, and a second face 49, called the front face, that here is convex.

It will be noted that the front and back faces 49 and 48 define two diopters that will characterize the complementary optical function of each complementary optical element 47 of each ophthalmic lens 12.

Each complementary optical element 47 has a peripheral edge face connecting the back face 48 to the front face 49.

Here, each complementary optical element 47 has been additively manufactured on the back face 49 of a respective base lens 41 in order to form a respective ophthalmic lens 12. Thus, the front face 49 of each complementary optical element 47 is perfectly complementary to the back face 45 of the respective base lens 41 on which the complementary optical element 47 has been manufactured.

Each complementary optical element 47 therefore here forms a single extra thickness adjoined to the back face 45 of a respective base lens 41.

It will be noted that to additively manufacture the two complementary optical elements 47, the starting optical system 40 is inserted into the machine 1 and positioned on a receiving holder configured to receive and hold this system, for example by the temples 42 and front 43 of the frame.

Each complementary optical element 47 is manufactured directly to the frame outline, its peripheral edge face thus lying in the extension of the peripheral edge face of a respective base lens 41.

Each complementary optical element 47 is here formed by a plurality of predetermined volume elements that are juxtaposed and superposed to form a plurality of superposed layers of a material 60.

This plurality of superposed layers forms the body together with the back face 48 and the front face 49 of each complementary optical element 47.

The two ophthalmic lenses 12 thus obtained each have a body formed from the respective bodies of a base lens 41 and of a complementary optical element 47, a front face formed by the front face 26 of the respective base lens 41, a back face formed by the back face 48 of the respective complementary optical element 47 and a peripheral edge face formed by the respective peripheral edge faces of the base lens 41 and of the complementary optical element 47; and possess the optical function prescribed thereto.

Figure 5:
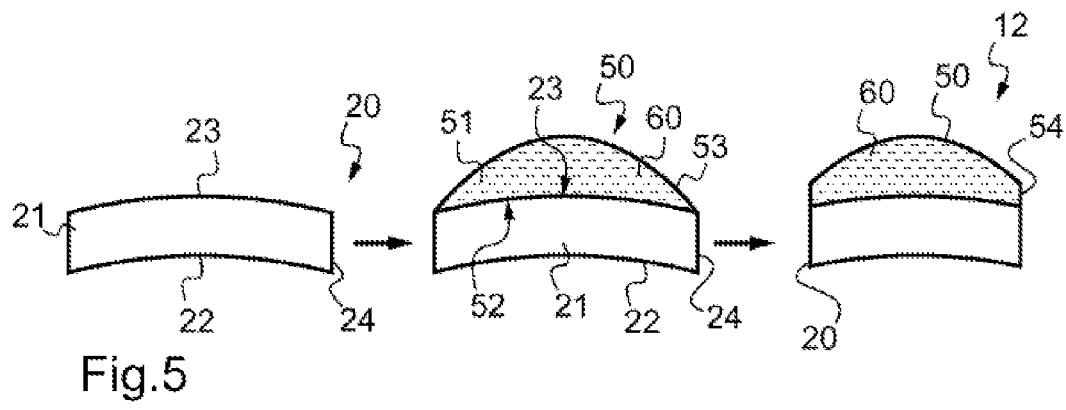

FIG. 5 schematically shows a third variant of the ophthalmic lens 12 obtained from a starting optical system 20 and a complementary optical element 50 additively manufactured in a machine different from that illustrated in FIG. 1. It is here a question of a stereolithography machine (not illustrated).

The starting optical system 20 is similar to that described with reference to FIG. 3.

The starting optical system 20 is here made of a material generally used to manufacture ophthalmic lenses, such as the allylic polymer known by the name CR39.

The starting optical system 20 therefore has a predetermined refractive index, for example equal to about 1.5.

The complementary optical element 50 has a body 51 provided with a first face 52, called the back face, that here is concave, and a second face 53, called the front face, that here is convex.

It will be noted that the front and back faces 53 and 52 also define two diopters that will characterize the complementary optical function of the complementary optical element 50 of the ophthalmic lens 12.

The complementary optical element 50 is manufactured so that it does not have a peripheral edge face but rather a peripheral edge flush with the peripheral edge face 24 of the starting optical system 20.

Here, the complementary optical element 50 has been additively manufactured on the front face 23 of the starting optical system 20 in order to form the ophthalmic lens 12. Thus, the back face 52 of the complementary optical element 50 is perfectly complementary to the front face 23 of the starting optical system 20.

The complementary optical element 50 therefore here forms a single extra thickness adjoined to the front face 23 of the starting optical system 20.

It will be noted that to additively manufacture the complementary optical element 50, the starting optical system 20 is inserted into the stereolithography machine and positioned on its receiving holder with the back face 22 of the starting optical system 20 resting on a face of the receiving holder.

The complementary optical element 50 is here manufactured using a stereolithography process and thus formed by a plurality of predetermined volume elements that are juxtaposed and superposed so as to form a plurality of superposed layers of a material 60.

In particular, the complementary optical element 50 is produced by depositing a plurality of at least one predetermined volume element over all the surface of the front face 23 of the starting optical system 20, in order to obtain the peripheral edge.

The plurality of superposed layers forms the body 51 together with the back face 52 and the front face 53 of the complementary optical element 50.

The ophthalmic lens 12 (formed from the starting optical system 20 and the complementary optical element 50) is then edged so as to give it a peripheral edge face referenced 54 in FIG. 5, which edge face matches the outline of a predetermined frame.

The ophthalmic lens 12 thus obtained has a body formed from the respective bodies 21 and 51 of the starting optical system 20 and of the complementary optical element 50, a front face formed by the front face 53 of the complementary optical element 50, a back face formed by the back face 22 of the starting optical system 20 and a peripheral edge face formed by the respective edged peripheral edge faces of the starting optical system 20 and of the complementary optical element 50; and possesses the optical function prescribed thereto.

Figure 6:
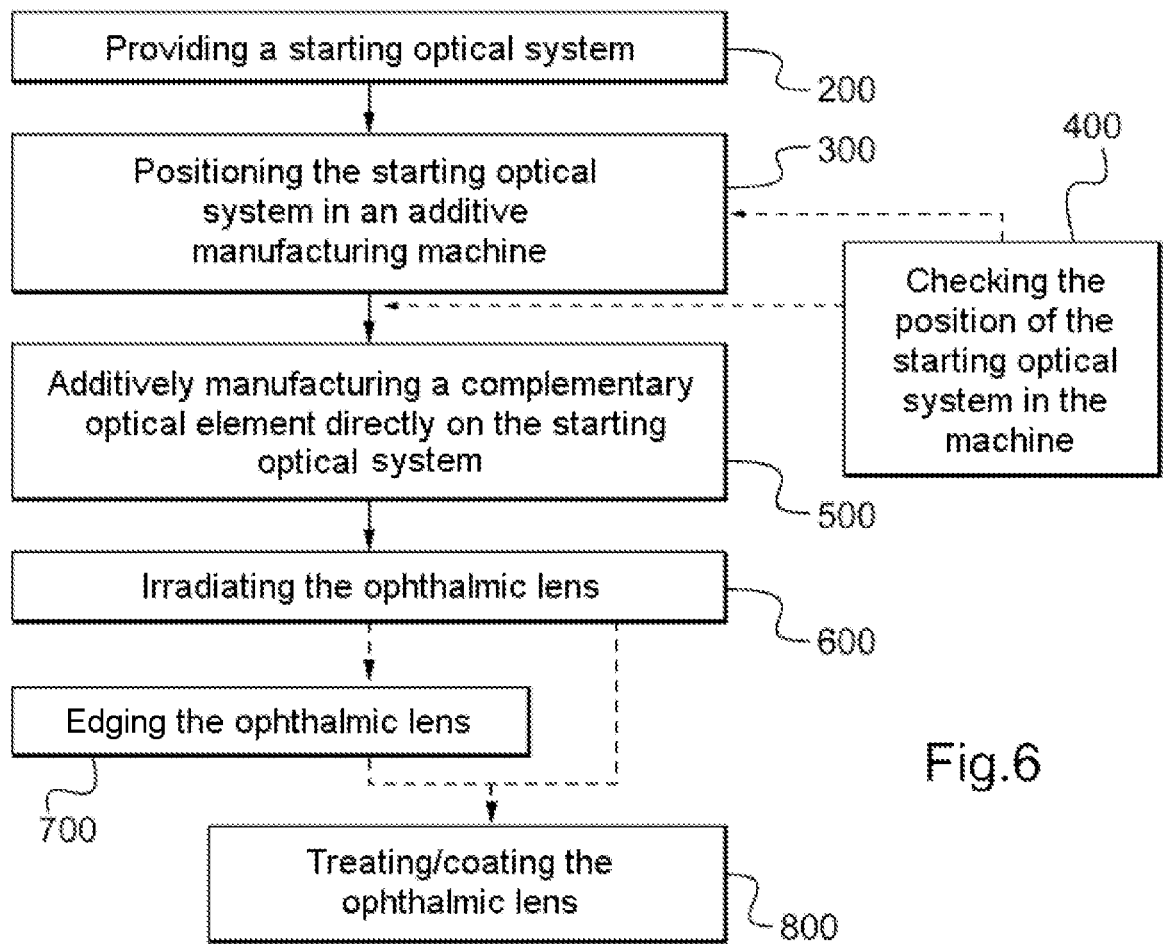
FIG. 6 is a flowchart illustrating various operating steps of a process for manufacturing an ophthalmic lens.

A process for manufacturing an ophthalmic lens 12 will now be described in more detail by way of FIG. 6 and with reference for example to FIG. 3.

The manufacturing process comprises the step 200 of providing the starting optical system 20.

The starting optical system 20 is chosen depending on the lens 12 to be manufactured and its geometry is therefore known, which geometry is characterized by a surface file that is stored in or loaded into the command/control unit 2 of the additive manufacturing machine 1.

In the case where the starting optical system 20 has a non-zero base optical function, the latter is also known and characterized directly in the surface file.

The process furthermore comprises the step 300 of inserting the starting optical system 20 into the additive manufacturing machine 1 and of positioning said starting optical system 20 in this machine 1, in an initial position relative to a coordinate system of this machine 1.

This initial position may be defined as being a position in which at least one of the faces of the starting optical system must be accessible so that the complementary optical element can be manufactured additively (this face being predetermined).

This initial position may be defined, as a variant or in addition, as being a position in which the starting optical system is centered (or at the very least in a predetermined position) relative to the coordinate system of the machine.

This initial position may also be defined, as a variant or in addition, as being a position in which the starting optical system is angularly oriented, for example in the case where the latter has a noncircular outline and/or a complex optical function and/or a cylinder.

This initial position may be defined, as a variant or in addition, as being a position in which the starting optical system is inclined.

In particular, the starting optical system 20, 41 is positioned on the receiving holder 10 of the machine 1.

The process optionally comprises the step 400 of checking the position of the starting optical system 20, 41 in the additive manufacturing machine 1 and the step of triggering a corrective action if there is a discrepancy between the initial position of the starting optical system 20, 41 and a predetermined position in the coordinate system of the machine 1.

This positional check may be carried out manually or may be computer assisted. Thus, the detecting system of the machine 1, which system is for example formed by an optical reading device and/or an image-capturing device and/or a mechanical device, is configured to detect the position of the starting optical system 20, 41 on the receiving holder and/or relative to the predetermined position in the coordinate system of the machine 1.

The corrective action may be manual or automated repositioning of the starting optical system 20, 41 on the receiving holder 10 and/or of the receiving holder 10 itself in the machine 1.

The corrective action may, as a variant or in addition, be modification of the additive manufacturing settings of the complementary optical element 25, 30, 35, 47 and 50 and/or of the ophthalmic lens 12 in order to match it to the initial position of the starting optical system.

The process furthermore comprises the step 500 of additively manufacturing the complementary optical element 25, 30, 35, 47 and 50 with the additive manufacturing machine 1 or another additive manufacturing machine such as a stereolithography machine, directly on the starting optical system 20, 41 and with a predetermined geometry and set manufacturing settings.

The process optionally comprises the step 600 of irradiating the ophthalmic lens 12 obtained. This step 600 completes the polymerization of the complementary optical element 25, 30, 35, 47 and 50.

The process optionally comprises the step 700 of at least partially edging the ophthalmic lens 12. This step 700 consists in creating a peripheral edge face on the lens 12 that is matched to a predetermined frame. This step 700 is necessary only if the outline of the starting optical system does not, before the step 500 of manufacturing the complementary optical element, already match the predetermined frame.

The process optionally comprises the step 800 of treating/varnishing at least one face of the ophthalmic lens 12. This step 800 consists in adding a coating having predetermined functional properties to at least one of the two faces of the lens 12. It may for example be a question of an antifog and/or antireflection coating and/or a tint and/or a photochromic and/or anti-scratch coating and/or deposition of a polarizing film, etc. It may also be a question of a film of a varnish chosen for its ability to mitigate surface irregularities (smoothing varnish configured to smooth asperities and surface roughness left behind by the additive manufacturing). In particular, reference is here being made to layers of varnishs, such as those described in patent application EP1896878 of the Applicant, or JP 2002-182011, which are configured to allow a surface having a certain initial quality to reach an ophthalmic quality, the application of this layer of varnish not modifying the principal curvatures of the surface of the lens, such as the principal curvature or a set of features defining the addition(s).

Figure 7:
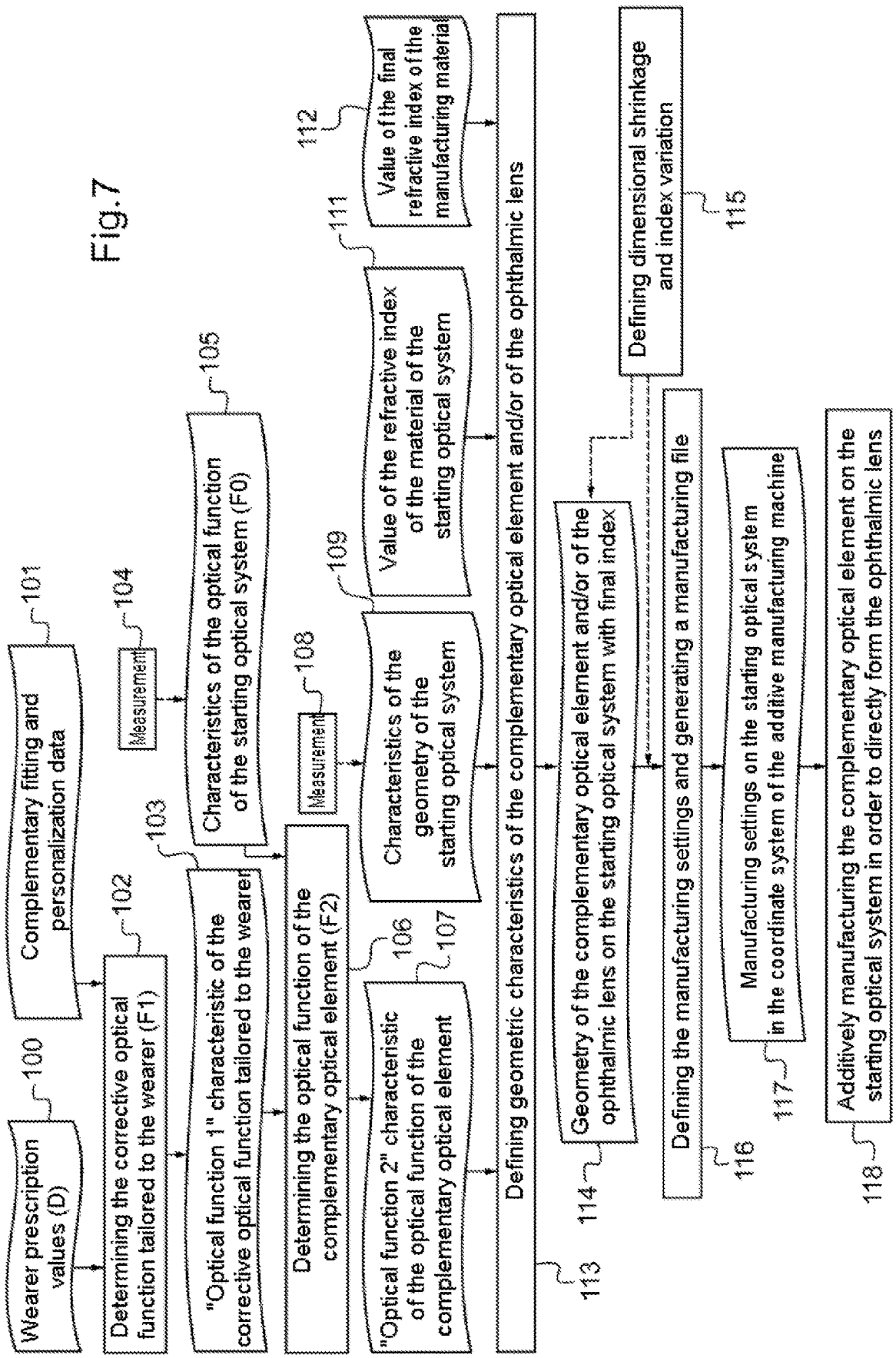
FIG. 7 is a flowchart illustrating other operating steps of the process for manufacturing at least one ophthalmic lens.

FIG. 7 illustrates steps of the manufacturing process and more precisely steps for defining manufacturing settings of the complementary optical element 25, 30, 35, 47 and 50, and/or of the ophthalmic lens 12, with a view to its additive manufacture by virtue of the additive manufacturing machine 1 illustrated in FIG. 1.

The command/control unit 2 of the additive manufacturing machine 1 is configured to receive in step 100 a file containing prescription values of a wearer of the ophthalmic lens 12 to be manufactured.

These prescription values of the wearer are generally expressed in diopters (D).

The unit 2 is furthermore configured to receive, in the step 101, complementary fitting and personalization data including data relating to the binocular vision of the wearer, these data being related to the wearer, to a frame intended to receive the ophthalmic lens 12 and to the prescription.

It will be noted that these complementary fitting and personalization data for example correspond to geometric values that especially characterize the frame and the visual behavior of the wearer. It may for example be a question of an eye-lens distance and/or a position of the eye rotation center, and/or of a eye-head coefficient, and/or of a pantoscopic angle and/or of a face-form angle of the frame and/or of the outline of the frame.

The unit 2 is configured to determine in the step 102 a corrective optical function tailored to the wearer from the wearer prescription values and complementary fitting and personalization data received in the respective steps 100 and 101, and depending on the geometric position of the lens 12 relative to the eye of the wearer.

This corrective optical function tailored to the wearer corresponds to the "target" optical function of the ophthalmic lens 12 to be manufactured.

It will be noted that the corrective optical function tailored to the wearer may be determined for example using a ray tracing software package, which allows the wearer power and the resulting astigmatism of the lens to be determined for the wear position of the latter. An optimization may be carried out using well-known optical optimization methods.

It will also be noted that the step 101 is optional and therefore that the corrective optical function tailored to the wearer may be determined by the unit 2 in the step 102, only from prescription values received in the step 101, and depending on the geometric position of the lens 12 relative to the eye of the wearer.

The unit 2 is configured to generate in the step 103 a file named "optical function 1" that characterizes this corrective optical function tailored to the wearer, also denoted $F_1$, determined in the step 102.

It will be noted that the corrective optical function tailored to the wearer may, instead of being determined by the unit 2 in the step 102, be received directly by this unit 2 in the form of such a file.

The unit 2 is configured to receive in the step 105, a file containing characteristics of the base optical function, denoted $F_0$, of the starting optical system 20, 41. This optical function may be simple, complex or afocal (or in other words zero).

This file is substantially similar to the "optical function 1" file, the difference being that it does not characterize the ophthalmic lens 12 to be manufactured but the chosen starting optical system 20, 41.

It will be noted that this file contains characteristics that are here measured directly from the starting optical system 20, 41, in the step 104. These characteristics could be predetermined and known and therefore not need to be measured.

The unit 2 is configured to determine, in the step 106, the complementary optical function, denoted $F_2$, that the complementary optical element 25, 30, 35, 47 and 50 will have after it has been additively manufactured.

It is in fact a question of the complementary optical function to be given to this complementary optical element 25, 30, 35, 47 and 50, called "optical function 2", this function taking into consideration the fact that said element 25, 30, 35, 47 and 50 is to be additively manufactured on the starting optical system 20, 41 (which itself has a base optical function), so that the ophthalmic lens 12 obtained from additively manufacturing the complementary optical element 25, 30, 35, 47 and 50 directly on the starting optical system 20, 41 provides the wearer with the prescribed corrective optical function $F_1$.

This determining step 106 is therefore carried out on the basis of characteristics, contained in the file generated in the step 103 and the file received (or generated) in the step 105, respectively, relating to the corrective optical function tailored to the wearer and to the base optical function of the starting optical system 20, 41.

The unit 2 is configured to generate in the step 107 a file named "optical function 2" that characterizes the complementary optical function of the complementary optical element 25, 30, 35, 47 and 50, said function having been determined in the step 106.

The unit 2 is furthermore configured to receive in the step 109, a file containing characteristics of the geometry of the starting optical system 20, 41.

It will be noted that this file contains geometric characteristics that are here measured directly from the starting optical system 20, 41, in the step 108. These characteristics could be predetermined and known and therefore not need to be measured.

These geometric characteristics may in particular include the outline of the starting optical system, the coordinates (x, y, z) of a finite number of points on each surface or a surface function for each surface and a thickness separating at each point the two surfaces, etc.

The unit 2 is furthermore configured to receive in the step 111, a file containing characteristics related to the refractive index of the starting optical system 20, 41.

It will be noted that the characteristics related to the refractive index of this starting optical system 20, 41 may be measured or predetermined and known, and therefore not need to be measured, whether the index is constant at every point in the starting optical system or not.

The unit 2 is furthermore configured to receive in the step 112, a file containing characteristics related to the final refractive index of the material 55, 60 used to additively manufacture the complementary optical element 25, 30, 35, 47 and 50. This index is said to be the final index because it is the index that this complementary optical element 25, 30, 35, 47 and 50 must have once the latter has been manufactured and polymerized on the starting optical system 20, 41, to form the ophthalmic lens 12.

The unit 2 is configured to define, in the step 113, geometric characteristics of the complementary optical element 25, 30, 35, 47 and 50 and/or of the ophthalmic lens 12 to be manufactured, from the files generated and/or received in the steps 107, 109, 111 and 112 and relating to the complementary optical function of the complementary optical element 25, 30, 35, 47 and 50, to the geometry and index of the starting optical system 20, 41, and to the value of the final index of the manufacturing material of the complementary optical element 25, 30, 35, 47 and 50, respectively.

The unit 2 is furthermore configured to generate in the step 114 a file that characterizes the geometric characteristics (defined in the step 113) of the complementary optical element 25, 30, 35, 47 and 50, and/or of the ophthalmic lens 12 to be manufactured.

This file contains geometric characteristics of the complementary optical element 25, 30, 35, 47 and 50, and/or of the ophthalmic lens 12, representative of the geometry desired for the complementary optical element 25, 30, 35, 47 and 50, and/or the ophthalmic lens 12 once the complementary optical element 25, 30, 35, 47 and 50 has been additively manufactured directly on the starting optical system 20, 41 with its final index (i.e. once polymerized or photopolymerized).

It will be noted that this file is what is called a surface file that for example contains geometric characteristics taking the form of x, y, z, θ coordinates of a finite number of points, or the form of a surface function z=f(x,y) defining each face, characteristics associated with a refractive index at each point and various distances and angles such as those mentioned above.

In other words, this surface file reflects a description of the geometry desired for the complementary optical element 25, 30, 35, 47 and 50 and/or the ophthalmic lens 12 to be manufactured, with, in practice, a set arrangement of the predetermined volume elements of the one or more materials.

It will be noted that this surface file may be displayed in the form of 3D modeling data typically in a CAD design file allowing the ophthalmic lens 12 provided with its starting optical system 20, 41 and its complementary optical system 25, 30, 35, 47 and 50 to be viewed as a digital object.

It will be noted that the geometry of the complementary optical element 25, 30, 35, 47 and 50 and/or of this ophthalmic lens 12 is defined so as to directly match the outline of the frame in which the lens 12 is configured to be fitted. A edging step is then necessary only if the starting optical system 20, 41 does not itself have an outline matched to this frame. As a variant, the outline of the element 25, 30, 35, 47 and 50 and/or of the lens 12, as defined in this file, does not correspond to the outline of the frame and a edging operation is required, whatever the outline of the starting optical system 20, 41.

The unit 2 is configured to define, optionally, in the step 115, a dimensional shrinkage and/or index variation of the complementary optical element 25, 30, 35, 47 and 50. It is here a question of possible subsequent changes, on the one hand, to the refractive index of the material 55, 60 in which the complementary optical element 25, 30, 35, 47 and 50 is manufactured, and on the other hand, to the geometry (dimensional shrinkage) of this complementary optical element 25, 30, 35, 47 and 50.

The unit 2 is furthermore configured to define, in the step 116, the manufacturing settings of the complementary optical element 25, 30, 35, 47 and 50, and thus to generate a manufacturing file named "manufacturing settings".

This step 116 of defining the settings is carried out on the basis of the characteristics, contained in the file generated in the step 114, relating to the geometry of the complementary optical element 25, 30, 35, 47 and 50 and/or of the ophthalmic lens 12 directly on the starting optical system 20, 41, with the final index, and on the basis of the dimensional shrinkage and the index variation defined in step 115.

The unit 2 is configured to generate in the step 117 the manufacturing file corresponding to the manufacturing settings used to manufacture the complementary optical element 25, 30, 35, 47 and 50 and/or of the ophthalmic lens 12 directly on the starting optical system 20, 41, which itself is positioned on the receiving holder 10 in a defined position in a coordinate system of the additive manufacturing machine 1.

This "settings" file is similar to the geometry file of the complementary optical element 25, 30, 35, 47 and 50 and/or the ophthalmic lens 12 generated in step 114, the difference being that it reflects a transcribed description of the geometry desired for this complementary optical element 25, 30, 35, 47 and 50 and/or this ophthalmic lens 12 to be manufactured, with, in practice, a modified arrangement of the predetermined volume elements of the one or more materials; including a set angular orientation of the complementary optical element 25, 30, 35, 47 and 50 on the starting optical system 20, 41 and/or of the starting optical system 20, 41 on the receiving holder 10 and/or of the receiving holder 10 in the machine 1 for manufacturing this complementary optical element 25, 30, 35, 47 and 50; and modifications for example related to possible dimensional shrinkage and possible variation in the index of the complementary optical element 25, 30, 35, 47 and 50, as defined in the step 115.

It is also on the basis of this "settings" file, which characterizes the geometry and the complementary optical function to be given to the complementary optical element 25, 30, 35, 47 and 50, that the latter is additively manufactured.

To do this, the unit 2 may also be configured to initiate, in the step 118, the additive manufacture of the complementary optical element 25, 30, 35, 47 and 50 directly on the starting optical system 20, 41 in the additive manufacturing machine 1, based on the characteristics in the manufacturing file generated in the step 117.

The command/control unit 2 is configured to run a software package designed to implement various steps of the process for manufacturing the ophthalmic lens 12, this software package using the received parameters to define the manufacturing settings of the complementary optical element 25, 30, 35, 47 and 50 and/or of the ophthalmic lens 12, or even to produce this complementary optical element 25, 30, 35, 47 and 50 and thus obtain the ophthalmic lens 12.

In one variant (not illustrated) a client-server communication interface has what is referred to as a provider side and what is referred to as a client side, these two sides communicating over a network, for example the Internet.

The provider side comprises a server connected to a command/control unit of the same type as that in FIG. 1, but this time not integrated into an additive manufacturing machine, this server being configured to communicate with the Internet interface.

The client side is configured to communicate with the Internet interface, and is connected to a command/control unit of the same type as that of the provider side.

Furthermore, the client-side unit is connected to an additive manufacturing machine of the same type as that in FIG. 1 for manufacturing the complementary optical element of the ophthalmic lens.

The unit is configured to receive, client-side, the data files corresponding to the step 100 and optionally the steps 101, 105, 109, 111 and 112.

This unit transmits via the Internet interface and the server these data to the provider-side unit in order to define the manufacturing settings of the complementary optical element and/or ophthalmic lens.

This unit runs, via its data processing system, the computer program that it contains for implementing the manufacturing process and thus deduces the manufacturing settings for the manufacture of the complementary optical element and/or the ophthalmic lens.

The unit transmits, via the server and the network, a file representative of the manufacturing settings defined in the client-side command/control unit.

The client-side unit is configured to run a program for implementing the manufacturing process of the ophthalmic lens, using the received parameters, in order to produce the complementary optical element and obtain the ophthalmic lens.

In one variant (not illustrated) the process may comprise various steps relating to optimization of the additive manufacturing, and in particular to the deposition of at least one material on the starting optical system during manufacture of the complementary optical element.

The process may comprise, for example either when the settings file is being run, or when said file is being written, a step of defining a preferential orientation of the starting optical system in the additive manufacturing machine depending on at least one criterion.

For example, in the case of a machine that additively manufactures by scanning a bank of nozzles, a scanning direction of the bank of nozzles may be identified so as to minimize, for all the steps of additive manufacturing of the complementary optical element, a distribution of distances between each nozzle of the bank of nozzles and the surface of the starting optical system. Specifically, when the surface of the starting optical system is pseudo-spherical, and the bank of nozzles is positioned above the surface, it is possible, on account of the altitude profile of each of the nozzles of the bank of nozzles, to define a value expressing variations in the distance between each nozzle and a point on the target surface for this nozzle. This value may be a standard deviation, an average, a difference between a maximum distance and a minimum distance, or any other parameter.

It will be noted that by taking into account the radii of curvature defining the surface of the starting optical system and the outline of the complementary optical element to be deposited on the surface, it is possible to determine an orientation of the bank of nozzles relative to the starting optical system that, for each position of the bank of nozzles in the additive manufacturing step, minimizes the aforementioned value so as to minimize variations in the distance between the nozzle and the starting optical element.

For example, if one of the dimensions of the complementary optical element to be manufactured is larger than another, it is frequently the case that the variation in height is greater on the path tracing the largest dimension. The contrary may also be the case for certain toric, atoric and aspherical lenses and/or lenses comprising an addition, depending on the orientation of the axes of the toroid and/or on the position of the addition.

The more uniform the distance between the surface to be covered and each of the nozzles is for all the nozzles of the bank, the easier it is to control the precision of the deposition during projection of material from the nozzles.

Alternatively, if the bank of nozzles has a given length and there exists a rectangle that contains the outline of the complementary optical element and that is tangent to this outline at at least one point on each of the sides of this rectangle, and the length of the smallest of the sides of this rectangle is smaller than the length of the bank of nozzles, the starting optical system may be positioned so that the entirety of the outline of the complementary optical element is covered by the bank of nozzles in a single pass.

It will be noted that the steps, described above, relating to optimization of the additive manufacturing, may be implemented both in a process for manufacturing an ophthalmic lens such as the process described above, i.e. one comprising a step of additively manufacturing a complementary optical element on a starting optical system, and in other processes for manufacturing an ophthalmic lens, for example comprising a step of additively manufacturing the ophthalmic lens (of integral construction), or a step of additively manufacturing a complementary optical element on a manufacturing holder of the additive manufacturing machine followed by a step of adding this complementary optical element (or even this element together with the manufacturing holder) to a starting optical system having an optical function.

As variants (not illustrated):
the superposed and juxtaposed plurality of predetermined volume elements forms superposed layers that each have a thickness that is constant or that varies over their length and/or that all do or do not have the same thickness;
the material is a photopolymerizable composition comprising one or more families of molecules having one or more acrylic, methacrylic, acrylate or methacrylate functions; a family of molecules having one or more epoxy, thioepoxy or thiolene functions; a family of molecules having one or more vinyl ether, vinyl caprolactam or vinylpyrolidone functions; a family of hyperbranched or hybrid organic/inorganic materials; or a combination of these functions; the mentioned chemical functions possibly being carried by monomers or oligomers or a combination of monomers and oligomers;
the material may comprise at least one photoinitiator;
the material may comprise colloids, in particular colloidal particles of smaller size for example than visible wavelengths, such as for example colloidal particles of silicon oxide $SiO_2$ or colloidal particles of zircon oxide $ZrO_2$;
the material may comprise, in at least certain of the predetermined volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as a rare-earth cryptate or chelate;
the starting optical system is produced from other materials, such as polycarbonate, polymethyl methacrylate, polyamide or from the following polymers: thiourethane polymers, allyl-carbonate polymers, acrylic polymers, urethane polymers and/or episulfide polymers; these materials being well known to those skilled in the art in the field of ophthalmic lenses;
the starting optical system may comprise on at least one face one or more treatments including an antireflection treatment, an anti-smudge treatment, an anti-scratch treatment, an antishock treatment and a polarization filter;
the starting optical system may comprise one or more treatments such as those mentioned above on both its surfaces, or the starting optical system may even comprise a bond layer and/or may comprise at least one layer allowing the optical impedance of the starting optical system to be matched to that of the complementary optical element when said system and element have different refractive indices;

the aforementioned treatments may for example be produced by transfer or by lamination, or in other words adhesive bonding, of a functional film;

the starting optical system may comprise an active element such as a waveguide or a network of cells containing one or more materials having a refractive index or an absorbance that varies as a function of external stimuli, such as an electrochromic composition or liquid crystals or a photochromic composition;

when the starting optical system comprises ophthalmic lenses already fitted in a frame, the process may comprise a step of removing the ophthalmic lenses from the frame before positioning them in the additive manufacturing machine;

the process furthermore comprises one or more other manufacturing steps, for example a edging step and/or a marking step used to form what are referred to as temporary marks;

the additive manufacturing process comprises an additional thermal irradiation step in which the whole of the additively manufactured structure is polymerized or set;

the manufacturing process comprises a step in which variation in the refractive index of the complementary optical element material is taken into account by way of an iterative optimization loop according to known optimization procedures;

the material of the complementary optical element optionally comprises one or more dyes, and/or nanoparticles configured to modify its optical transmission and/or its appearance, and/or nanoparticles or additives configured to modify its mechanical properties;

the additive manufacturing machine is not a three-dimensional printing machine but rather a stereolithography machine (or SLA for stereolithography apparatus) or a thermoplastic filament extrusion machine, also called a fused deposition modelling machine (or FDM machine);

at least one command/control unit comprises a microcontroller instead of a microprocessor;

the client-server communication interface comprises devices configured to transfer the manufacturing settings of the complementary optical element and/or of the ophthalmic lens defined by a computer program, which contains instructions configured to implement each of the steps of the manufacturing process described above when this computer program is run in at least one command/control unit that comprises system elements configured to run said computer program;

the communication interface enables communication via means other than the Internet, for example via an intranet or a secure private network; and/or the communication interface makes it possible to transfer the entire computer program to a remote data processing system so as to implement the manufacturing process in another manufacturing system provided with an additive manufacturing machine and optionally at least one edging machine and/or one or more other processing/treatment machines.

It is recalled more generally that the invention is not limited to the examples described and shown.

The invention claimed is:

1. A process for manufacturing at least one ophthalmic lens having at least one optical function, comprising:
   providing a starting optical system of said at least one ophthalmic lens, said starting optical system having an outline adapted to a shape of a predetermined frame and having a base optical function delivered by a front face and a back face of said starting optical system; and
   additively manufacturing an optical element that is complementary to said at least one ophthalmic lens, by depositing a plurality of predetermined volume elements of at least one material having a predetermined refractive index, directly on at least one of said front face and back face of said starting optical system;
   said additive manufacturing step comprising defining manufacturing settings of said complementary optical element from characteristics of said at least one optical function to be provided to said at least one ophthalmic lens, from characteristics of said at least one base optical function of said starting optical system, from geometric characteristics of said starting optical system, including geometric characteristics in relation to the outline adapted to the shape of the predetermined frame, and from said predetermined refractive index of said at least one material.

2. The process of claim 1, wherein said additive manufacturing step comprises the determining geometric characteristics of said complementary optical element and/or of said at least one ophthalmic lens from characteristics of at least one complementary optical function to be provided to said complementary optical element, from said geometric characteristics of said starting optical system and from said predetermined refractive index of said at least one material.

3. The process of claim 1, wherein said additive manufacturing step comprises determining at least one complementary optical function to be provided to said complementary optical element from said characteristics of said at least one optical function to be provided to said at least one ophthalmic lens and from said characteristics of said at least one base optical function of said starting optical system.

4. The process of claim 1, wherein said additive manufacturing step comprises determining said at least one optical function to be given to said at least one ophthalmic lens from prescription values associated with a wearer of said at least one ophthalmic lens and complementary fitting data of the predetermined frame and/or frame-shape data.

5. The process of claim 4, wherein said at least one optical function to be given to said at least one ophthalmic lens is further determined from complementary fitting data of the predetermined frame and/or personalization data, corresponding to geometric values that characterize the predetermined frame and the visual behavior of the wearer, including an eye-lens distance and/or a position of an eye rotation center, and/or of an eye-head coefficient, and/or of a pantoscopic angle and/or of a face-form angle of the predetermined frame and/or of the outline of the predetermined frame.

6. The process of claim 1, wherein said additive manufacturing step comprises measuring said characteristics of said at least one base optical function of said starting optical system and/or measuring said geometric characteristics of said starting optical system.

7. The process of claim 1, wherein said at least one material from which said complementary optical element is additively manufactured is different from the constituent material of said starting optical system.

8. The process of claim 1, wherein said starting optical system is formed by an assembly comprising the predetermined frame and two initial ophthalmic lenses fitted in said predetermined frame, and said process comprises additively manufacturing two said complementary optical elements, one on each of said initial ophthalmic lenses used as starting optical system, in order to form two said ophthalmic lenses, said manufacturing settings furthermore being determined from characteristics related to the binocular vision of a wearer of said two ophthalmic lenses.

9. The process of claim 1, wherein said additive manufacturing step is carried out by depositing a plurality of at least one predetermined volume element of said at least one material on at least all the work area of at least one of said front face and back face of said starting optical system.

10. The process of claim 1, further comprising, before said additive manufacturing step, placing and positioning said starting optical system on a receiving holder in an additive manufacturing machine.

11. The process of claim 10, further comprising, after positioning said starting optical system and before said additive manufacturing step, checking the position of said starting optical system in said additive manufacturing machine and the step of triggering a corrective action if there is a discrepancy between the actual position of said starting optical system and a predetermined position.

12. The process of claim 1, wherein, after said additive manufacturing step, said complementary optical element has an outline substantially equal to an outline configured to be inserted into the predetermined frame.

13. An additive manufacturing machine configured to manufacture an ophthalmic lens and comprising a command/control unit provided with system elements configured to run a computer program comprising instructions configured to implement each of the steps of the process of claim 1.

14. The machine of claim 13, further comprising a receiving holder configured to receive said starting optical system, said receiving holder and/or said starting optical system being configured so that the latter is positioned in a predetermined position relative to a coordinate system of said machine.

15. The machine of claim 13, further comprising a detecting system configured to detect the position of said starting optical system on said receiving holder and/or relative to said predetermined position in said coordinate system of said machine.

16. The machine of claim 15, wherein the detecting system is formed by an optical reading device and/or an image-capturing device.

* * * * *